United States Patent Office 2,797,236
Patented June 25, 1957

2,797,236

LOWER ALKANOATE ESTERS OF 3-METHYL-6-CYCLOHEXYLIDENE-1-HEXEN-3-OL AND THE CORRESPONDING 1-HEXYN ANALOG

James A. Birbiglia, Nutley, George O. Chase, Hawthorne, and Julius Galender, West Paterson, N. J., assignors to Hoffmann-La Roche Inc., Nutley, N. J., a corporation of New Jersey No Drawing. Application November 30, 1956,
Serial No. 625,238

10 Claims. (Cl. 260—488)

This invention relates to novel chemical compounds and to novel methods of preparing the same. More particularly, the invention relates to novel cyclic esters, useful as odorants, and to the preparation thereof.

In one comprehensive embodiment, the invention may be succinctly described as relating to a process which comprises reacting 3-methyl-6-cyclohexylidene-1-hexyn-3-ol with a lower alkanoic acid anhydride in the presence of an esterification catalyst, thereby producing 3-methyl-6-cyclohexylidene-1-hexyn-3-yl lower alkanoate; and reacting the latter with approximately one molar proportion of elemental hydrogen in the presence of a selective hydrogenation catalyst preferentially catalyzing the hydrogenation of an acetylenic linkage only to the olefinic stage, thereby producing 3-methyl-6-cyclohexylidene-1-hexen-3-yl lower alkanoate.

In the first stage of the comprehensive embodiment referred to above, 3-methyl-6-cyclohexylidene-1-hexyn-3-ol is acylated by reaction with a lower alkanoic acid anhydride. Exemplary lower alkanoic acid anhydrides which can be employed are acetic anhydride, propionic anhydride, isobutyric anhydride, mixed anhydrides of lower alkanoic acids, and the like. A preferred specific mode of execution comprises mixing 3-methyl-6-cyclohexylidene-1-hexyn-3-ol with a slight molar excess of the lower alkanoic acid anhydride, at about room temperature, and in the presence of an acidic esterification catalyst. Among preferred acidic esterification catalysts are phosphoric acid and p-toluenesulfonic acid, but other acidic esterification catalysts can be employed.

The second stage of the comprehensive embodiment referred to above comprises reacting 3-methyl-6-cyclohexylidene-1-hexyn-3-yl lower alkanoate, such as produced by the first stage described in the preceding paragraph, with approximately one molar proportion of elemental hydrogen in the presence of a selective hydrogenation catalyst preferentially catalyzing the hydrogenation of an acetylenic linkage only to the olefinic stage. Selective hydrogenation catalysts having the specified characteristic are well known to the art; for example, see the publication by Lindlar, Helvetica Chimica Acta 35, 446–450 (1952). Particularly preferred as selective hydrogenation catalysts are the lead-palladium hydrogenation catalysts disclosed in the cited publication, especially the lead-palladium-on calcium carbonate catalyst specifically disclosed at page 450 thereof. In a preferred mode of execution, 3-methyl-6-cyclohexylidene-1-hexyn-3-yl lower alkanoate is dissolved in an inert organic solvent; and is reacted with elemental hydrogen in the presence of a lead-palladium-on calcium carbonate selective hydrogenation catalyst (described by Lindlar, cited) at temperatures between about 15° C. and about 30° C. and at moderate superatmospheric hydrogen pressures, until about one molar proportion of hydrogen has been taken up.

An important aspect of the invention relates to novel compounds which can be designated generically by the nomenclature: 3-methyl-6-cyclohexylidene-1-hexen-3-yl lower alkanoate. These can be represented graphically by the following general formula I 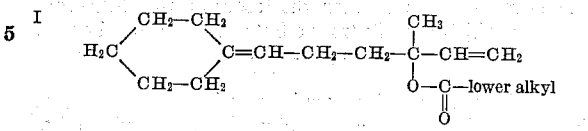

Compounds of the above Formula I are useful as odor-imparting materials in the preparation of perfumes and of other scented compositions. The odors of these compounds may be characterized boardly as being of a floral, fruity character, generally reminiscent of bergamot.

Still another important aspect of the invention relates to novel compounds which can be designated generically by the nomenclature: 3-methyl-6-cyclohexylidene-1-hexyn-3-yl lower alkanoate. These can be represented graphically by the following general formula II 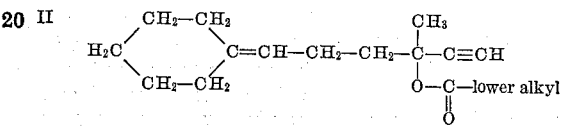

Compounds of the above Formula II are useful as odor-imparting materials in the preparation of perfumes and of other scented compositions. The odors of these compounds may be characterized broadly as being generally of a muguet character.

The starting material employed in the processes of the invention, 3-methyl-6-cyclohexylidene-1-hexyn-3-ol, may be prepared as follows:

*Preparation of 3-methyl-6-cyclohexylidene-1-hexyn-3-ol*

445 g. of 1-vinyl-cyclohexanol was stirred for one hour with 1500 cc. of concentrated aqueous hydrochloric acid (containing 37% by weight HCl). The oil layer was separated, washed twice with water, and dried over calcium chloride. The 2-cyclohexylideneethyl chloride thus obtained had $n_D^{25} = 1.4994$.

In a five-liter flask, there was placed 390 g. of ethyl acetoacetate, 157 g. of sodium methylate and two liters of benzene. 414 g. of 2-cyclohexylideneethyl chloride was added at 40° C. in 30 minutes while stirring vigorously. The reaction mixture was stirred for three hours at 60°–70° C., then for two hours at reflux temperature. After cooling, the reaction mixture was washed twice, each time with two liters of water. The benzene was distilled off under vacuum. The residual light brown colored syrup was dissolved in two liters of ethyl alcohol. This was placed in a flask together with 200 g. of potassium hydroxide and 500 cc. of water. The saponification was accomplished by stirring at 40°–50° C. for four hours. Concentrated hydrochloric acid was dropped in from a separatory funnel, at such a rate that evolution of carbon dioxide did not cause foaming, until the mixture became strongly acid. The oil layer was removed. The aqueous layer was diluted with two liters of water and extracted with 500 cc. of benzene. The benzene extract and the oil layer were combined, washed neutral and dried over calcium chloride. On fractionation, there was obtained 5-cyclohexylidene-2-pentanone, distilling at 103° C./6 mm., $n_D^{25} = 1.4760$.

26 g. of metallic sodium was dissolved in one liter of liquid ammonia. Acetylene was bubbled into the solution, while stirring, until the color of the solution changed from deep blue to white. 159 g. of 5-cyclohexylidene-2-pentanone in 200 cc. of diethyl ether was dropped into the stirred reaction mixture in one hour. Stirring was continued for three more hours while a slow stream of acetylene was bubbled in. The acetylene addition was stopped and the stirring was continued for 15 hours longer. The ammonia was then distilled off and the residue was washed with 2 liters of 5% aqueous sulfuric acid. The product was water washed, and dried over calcium sulfate. Upon fractionation, there was obtained 3-methyl-6-cyclohexylidene-1-hexyn-3-ol, distilling at 75° C./0.2 mm., $n_D^{25}=1.4920$.

The invention is further disclosed in the following examples, which are illustrative but not limitative thereof.

EXAMPLE 1

In a 1-liter, 3-neck flask equipped with a thermometer, stirrer, dropping funnel and calcium chloride drying tube, were placed 192.3 g. (1.0 mol) of 3-methyl-6-cyclohexylidene-1-hexyn-3-ol and 1.78 g. of syrupy phosphoric acid (containing 85% by weight $H_3PO_4$). To this mixture was added slowly (over a 30 minute period), and while stirring, a total of 123.5 g. (1.2 mols) of acetic anhydride. The reaction temperature was controlled by means of a bath of cooling water and was held between 25° and 30° C. The reaction was quite energetic and the mixture darkened in color. When no further energy was evolved, the reaction mixture was permitted to stand overnight at room temperature. The reaction mixture was diluted with 200 cc. of petroleum naphtha, and 200 cc. of cold water was added, while stirring. The mixture was transferred to a separatory funnel, the aqueous phase was drawn off, and the excess acidity in the organic phase was destroyed by washing with 10% aqueous sodium carbonate solution until the reaction mixture showed a pH of 11. Washing was continued with water until the washes were neutral to red and blue litmus. The product was dried, the solvent was removed under reduced pressure, and the residue was distilled in high vacuum. 3-methyl-6-cyclohexylidene-1-hexyn-3-yl acetate was obtained in a fraction boiling at 108° to 111° C./0.1 mm. Hg; $n_D^{25}=1.4784$ to 1.4794. This material had an odor reminiscent of muguet.

EXAMPLE 2

In a 5-liter, 3-neck flask equipped with a sealed stirrer, hydrogenation tube, and thermometer were placed 234.3 g. (1 mol) of 3-methyl-6-cyclohexylidene-1-hexyn-3-yl acetate, 235 cc. of petroleum naphtha, and 2.4 g. of Pb–Pd–CaCO3 catalyst [Lindlar, Helvetica Chimica Acta 35, 450 (1952)]. The hydrogenator was flushed with nitrogen and then with hydrogen. The stirrer was started, and the hydrogenation was carried out at 8 to 10 inches of water pressure at a temperature of 15° C. The absorption of hydrogen was theoretical and a test made for acetylenic bodies with ammoniacal silver nitrate test solution was negative. The catalyst was removed by filtration, and the solvent was removed under reduced pressure. 3-methyl-6-cyclohexylidene-1-hexen-3-yl acetate was obtained in a fraction boiling at 139° to 142° C./0.3 mm. Hg; $n_D^{25}=1.4762$ to 1.4772. This material had a sweet pleasant odor reminiscent of bergamot.

EXAMPLE 3

In a 1-liter, 3-neck flask equipped with a thermometer, stirrer, dropping funnel and a calcium chloride drying tube were placed 200 cc. of acetic anhydride. To this was added slowly, through the dropping funnel, 100 cc. of formic acid, while stirring and cooling to maintain a temperature of 30° C. Considerable energy was evolved, and the mixture darkened in color. When no further energy was evolved, 1.78 g. of syrupy phosphoric acid (85% by weight $H_3PO_4$) were added along with 192.3 g. (1.0 mol) of 3-methyl-6-cyclohexylidene-1-hexyn-3-ol. The reaction mixture was stirred for eight hours at 25°–30° C. The mixture was permitted to stand for three days at 25° C. The product was then stirred with 200 cc. of cold water, diluted with 200 cc. of petroleum naphtha, and transferred to a separatory funnel. The aqueous phase was drawn off and the organic layer was washed again with 200 cc. of cold water. The excess acidity in the organic phase was destroyed by washing with 10% aqueous sodium carbonate solution to a pH of 11, and then with sufficient water until neutral to red litmus. The organic layer was dried, the solvent was removed, and the residue was distilled in high vacuum. 3-methyl-6-cyclohexylidene-1-hexyn-3-yl formate was obtained in a fraction boiling at 89° to 92° C./0.2 mm. Hg; $n_D^{25}=1.4819$ to 1.4829. This material had a pleasant fruity odor reminiscent of muguet.

EXAMPLE 4

In a 5-liter, 3-neck flask equipped with a sealed stirrer, hydrogen addition tube, and thermometer were placed 220.3 g. (1.0 mol) of 3-methyl-6-cyclohexylidene-1-hexyn-3-yl formate, 220 cc. of petroleum naphtha, and 2.2 g. of Pb–Pd–CaCO3 catalyst [Lindlar, Helvetica Chimica Acta 35, 450 (1952)]. The hydrogenator was flushed with nitrogen and then with hydrogen. The stirrer was started and the hydrogenation was carried out at 8 to 10 inches of water pressure at a temperature of 15° C. The absorption of hydrogen was theoretical. A test made for acetylenic bodies with ammoniacal silver nitrate was negative. The catalyst was removed by filtration and the solvent was removed under reduced pressure. The residue was distilled in vacuo. 3-methyl-6-cyclohexylidene-1-hexen-3-yl formate was obtained in a fraction boiling at 103° to 105° C./0.1 mm. Hg; $n_D^{25}=1.4795$ to 1.4805. This material had an odor reminiscent of bergamot with a fruity accent.

EXAMPLE 5

In similar manner to Example 1, 192.3 g. (1.0 mol) of 3-methyl-6-cyclohexylidene-1-hexyn-3-ol was reacted with 156.2 g. (1.2 mols) of propionic anhydride in the presence of 1.78 g. of syrupy phosphoric acid (85% by weight $H_3PO_4$) at 25°–30° C. The reaction mixture was diluted with 200 cc. of petroleum naphtha and 200 cc. of cold water. The aqueous phase was withdrawn, the excess acidity in the organic layer was neutralized, and the material was fractionated. 3-methyl-6-cyclohexylidene-1-hexyn-3-yl propionate was obtained in a fraction boiling at 90° to 92° C./0.1 mm. Hg; $n_D^{25}=1.4770$ to 1.4780. This material had a fruity odor reminiscent of muguet.

EXAMPLE 6

248.4 g. (1.0 mol) of 3-methyl-6-cyclohexylidene-1-hexyn-3-yl propionate was dissolved in 250 cc. of petroleum naptha. 2.5 g. of the same Pb–Pd–CaCO3 catalyst employed in Example 2 was added and the ester was hydrogenated under a hydrogen pressure of 8 to 10 inches of water at 15° C. The reaction mixture was worked up in the manner indicated in Example 2. There was thus obtained 3-methyl-6-cyclohexylidene-1-hexen-3-yl propionate, boiling at 105°–109° C./0.1 mm. Hg;

$$n_D^{25}=1.4745$$

to 1.4755. This material had a fruity, slightly mint-like odor.

EXAMPLE 7

In the same manner indicated in Example 1, 192.3 g. (1.0 mol) of 3-methyl-6-cyclohexylidene-1-hexyn-3-ol was reacted with 189.8 g. (1.2 mols) of isobutyric anhydride in the presence of 1.78 g. of phosphoric acid (containing 85% by weight $H_3PO_4$). The reaction mixture was worked up in the manner indicated in Example 1, and there was thus obtained 3-methyl-6-cyclohexylidene-1-hexyn-3-yl isobutyrate, boiling at 105° to 107° C./0.5 mm. Hg; $n_D^{25}=1.4745$ to 1.4750. This material had a pleasant, fruity, muguet-type odor.

EXAMPLE 8

In the same manner indicated in Example 2, 263.4 g. (1.0 mol) of 3-methyl-6-cyclohexylidene-1-hexyn-3-yl isobutyrate was dissolved in 265 cc. of petroleum naphtha. 2.7 g. of the same Pb–Pd–CaCO3 catalyst employed in Example 2 was added and the mixture was hydrogenated under a hydrogen pressure of 8 to 10 inches of water. The reaction mixture was worked up in the manner indicated in Example 2, and there was thus obtained 3-methyl-6-cyclohexylidene-1-hexen-3-yl isobutyrate, boiling at 117° to 120° C./0.1 mm. Hg; $n_D^{25}$=1.4720 to 1.4730. This material had a fruity, floral odor.

We claim:

1. A process which comprises reacting 3-methyl-6-cyclohexylidene-1-hexyn-3-ol with a lower alkanoic acid anhydride in the presence of an acidic esterification catalyst, thereby producing 3-methyl-6-cyclohexylidene-1-hexyn-3-yl lower alkanoate; and reacting the latter with approximately one molar proportion of elemental hydrogen in the presence of a selective hydrogenation catalyst preferentially catalyzing the hydrogenation of an acetylenic linkage only to the olefinic stage, thereby producing 3-methyl-6-cyclohexylidene-1-hexen-3-yl lower alkanoate.

2. 3-methyl-6-cyclohexylidene-1-hexen-3-yl lower alkanoate.

3. A process of making 3-methyl-6-cyclohexylidene-1-hexen-3-yl lower alkanoate which comprises reacting 3-methyl-6-cyclohexylidene-1-hexyn-3-yl lower alkanoate with approximately one molar proportion of elemental hydrogen in the presence of a selective hydrogenation catalyst preferentially catalyzing the hydrogenation of an acetylenic linkage only to the olefinic stage.

4. 3-methyl-6-cyclohexylidene-1-hexyn-3-yl lower alkanoate.

5. A process of making 3-methyl-6-cyclohexylidene-1-hexyn-3-yl lower alkanoate which comprises reacting 3-methyl-6-cyclohexylidene-1-hexyn-3-ol with a lower alkanoic acid anhydride in the presence of an acidic esterification catalyst.

6. 3-methyl-6-cyclohexylidene-1-hexen-3-yl formate.

7. 3-methyl-6-cyclohexylidene-1-hexen - 3 - yl isobutyrate.

8. 3-methyl-6-cyclohexylidene-1-hexen-3-yl acetate.

9. 3-methyl-6-cyclohexylidene-1-hexyn-3-yl formate.

10. 3-methyl-6-cyclohexylidene-1-hexyn-3 - yl isobutyrate.

References Cited in the file of this patent

Locquin et al.: Compt. Rend. 174 (1922), pp. 1427–9, 1551–3 and 1711–3.

Lacey: J. Chem. Soc. (London) 1954, pp. 827–39.